(12) United States Patent
Fryers et al.

(10) Patent No.: US 12,167,728 B2
(45) Date of Patent: Dec. 17, 2024

(54) SYSTEMS AND METHOD FOR DETECTING THE PRESENCE OF PESTS

(71) Applicant: SPOTTA LIMITED, Cambridge (GB)

(72) Inventors: Robert Fryers, Cambridge (GB); Neil D'Souza-Mathew, Cambridge (GB); Gareth Funk, Cambridge (GB)

(73) Assignee: SPOTTA LIMITED, Cambridge (GB)

( * ) Notice: Subject to any disclaimer, the term of this patent is extended or adjusted under 35 U.S.C. 154(b) by 0 days.

(21) Appl. No.: 17/797,960

(22) PCT Filed: Feb. 5, 2021

(86) PCT No.: PCT/GB2021/050262
§ 371 (c)(1),
(2) Date: Aug. 5, 2022

(87) PCT Pub. No.: WO2021/156630
PCT Pub. Date: Aug. 12, 2021

(65) Prior Publication Data
US 2023/0064467 A1    Mar. 2, 2023

(30) Foreign Application Priority Data
Feb. 7, 2020  (GB) .................................... 2001718

(51) Int. Cl.
*A01M 31/00*  (2006.01)
*A01M 1/02*  (2006.01)

(52) U.S. Cl.
CPC .......... *A01M 31/002* (2013.01); *A01M 1/026* (2013.01); *A01M 2200/01* (2013.01)

(58) Field of Classification Search
None
See application file for complete search history.

(56) References Cited

U.S. PATENT DOCUMENTS

2005/0025357 A1*  2/2005  Landwehr ............. A01M 3/005
                                                        382/224
2009/0193707 A1    8/2009  Moran et al.
(Continued)

FOREIGN PATENT DOCUMENTS

EP    3466256 B1    7/2020
GB    2570138 A     7/2019
(Continued)

OTHER PUBLICATIONS

First Exam Report issued in UK Application No. GB2001718.2, mailed Jun. 28, 2023, 6 pages.
(Continued)

*Primary Examiner* — Thomas S McCormack
(74) *Attorney, Agent, or Firm* — Talem IP Law, LLP

(57) ABSTRACT

A system for detecting the presence of pests. In one aspect the system comprises an imaging system including: a housing including one or more pest entrances; a pest attractant arranged within the housing; a pest detection surface; an image capture device, said image capture device being configured to capture one or more images of the pest detection surface; and a triggering sensor arrangement for detecting a target pest that is on or about to enter the pest detection surface, said triggering sensor arrangement being configured to provide a trigger-signal if the presence of an object is detected, the image capture device being configured to take an image of the pest detection surface in response to the trigger-signal.

21 Claims, 4 Drawing Sheets

(56) References Cited

U.S. PATENT DOCUMENTS

| | | |
|---|---|---|
| 2013/0229515 A1 | 9/2013 | Barley et al. |
| 2013/0293710 A1 | 11/2013 | Afanasyev et al. |
| 2015/0085100 A1* | 3/2015 | Raschella ............... A01K 61/90 348/82 |
| 2017/0231215 A1 | 8/2017 | Barton |
| 2018/0249696 A1 | 9/2018 | Daly, Jr. et al. |
| 2019/0239498 A1 | 8/2019 | Moore et al. |
| 2019/0246625 A1* | 8/2019 | Gobetz ................. H04N 23/60 |
| 2020/0305406 A1 | 10/2020 | Ritchie et al. |

FOREIGN PATENT DOCUMENTS

| | | |
|---|---|---|
| KR | 100831364 B1 | 5/2008 |
| RO | 132959 | 12/2018 |
| WO | 2014125158 A1 | 8/2014 |
| WO | 2016/130182 A1 | 8/2016 |
| WO | 2018/131853 A1 | 7/2018 |
| WO | 2019138242 A1 | 7/2019 |

OTHER PUBLICATIONS

International Search Report and Written Opinion issued in International Application No. PCT/GB2021/050262, mailed Jun. 8, 2021, 18 pages.
Search Report issued in GB Application No. GB2001718.2, Mailed Date: Aug. 3, 2020, 2 pages.
Office Action issued in European Patent Office Application No. 21704922.0, mailed Apr. 9, 2024, 7 pages.
Third Party Observation filed in European Patent Office Application No. 20210704922.0, filed Aug. 16, 2024, 22 pages.

* cited by examiner

SYSTEMS AND METHOD FOR DETECTING THE PRESENCE OF PESTS

CROSS-REFERENCE TO RELATED APPLICATIONS

This application is the US National Stage Application of International Application No. PCT/GB2021/050262, filed Feb. 5, 2021, which claims priority to GB Patent Application Serial No. 2001718.2, filed Feb. 7, 2020, which are hereby incorporated by reference in their entirety.

TECHNICAL FIELD

The present disclosure relates to a system, method and apparatus for automatic detection of the presence of pests.

BACKGROUND

Existing pest trapping or monitoring solutions require regular human intervention. This is most commonly for inspection of the trap or monitor to identify any captured pests and determine what action is necessary. Existing solutions also require regular servicing, for example to replace consumables, such as attractants, or the trapping materials used, such as adhesive pads.

This need for regular human intervention is expensive and is often a source of errors, which can dramatically reduce the effectiveness and commercial viability of the trapping or monitoring solution.

In addition, the need for human intervention means that the system must be designed for this and must be placed in an accessible location to avoid making the servicing even more burdensome for the operator. However, many pests actively avoid locations where they are likely to be disturbed, which means that these locations are poor choices as monitoring locations. This can severely limit the effectiveness of the overall monitoring solution.

The need for accessibility usually means that the trap or monitor must be placed in a location where it is visible to passers-by. In many applications the presence of visible pest control measures is unacceptable. As an example, this is particularly true in the hospitality industry where patrons will react strongly and negatively to the presence of pest control measures because they will infer, rightly or wrongly, that it indicates that the premises has an ongoing pest problem. Raising awareness of the issue in this way can have a significant impact on the business and can be worse than the pest problem being addressed by the system. As a result, many businesses in these sectors are unwilling to employ the existing solutions except in extreme situations.

Some attempts have been made to automate the monitoring process through the introduction of electronic systems. However, these have not overcome the need for servicing as they still rely on consumables with short service lives. In addition, such systems usually require an external power source. This further limits the placement options for the trap or monitor and it can in fact make it more likely that a patron will notice the device.

Furthermore, existing electronic traps often do not include any means for transmitting their results to the end user. Where they do include this facility, it is accompanied by complicated setup procedures to connect the device to a local network. These limitations reduce the desirability and cost effectiveness of the product to potential customers.

A particular challenge faced by many insect pest traps and monitors is the short service life of the attractants used to lure pests into the trap or monitor. These are typically pheromones, kairomones or other scent chemicals which are volatile and are difficult to continuously release over a long period of time. Existing solutions restrict the evaporation rates of the constituent components of the lures. However, this does not address natural chemical degradation of the attractant which often occurs when the attractant is exposed to air or even through reactions between the constituent chemical components themselves.

In this application the words "trap", "detector" and "monitor" are used interchangeably for any device intended to indicate the presence or absence of a pest. For the purposes of this application, and the attached claims, it is immaterial whether the device captures, kills or otherwise affects the behaviour of the pest.

SUMMARY OF THE INVENTION

According to an aspect of the present disclosure, there is provided a system for detecting the presence of pests, the system comprising an imaging system including:
 a housing including one or more pest entrances,
 a pest attractant arranged within the housing;
 a pest detection surface;
 an image capture device, said image capture device being configured to capture one or more images of the pest detection surface; and
 a triggering sensor arrangement for detecting a target pest that is on or about to enter the pest detection surface, said triggering sensor arrangement being configured to provide a trigger-signal if the presence of an object is detected, the image capture device being configured to take an image of the pest detection surface in response to the trigger-signal,
 wherein the triggering sensor arrangement is configured to monitor an area between the one or more entrances and the pest attractant.

According to an embodiment, the system comprises an electric power source, such as a battery or a capacitor, with a limited amount of electric charge.

In another embodiment, the system comprises a service module removably attachable to the housing, and wherein said service module is adapted to receive the pest attractant and/or an electric power source.

In yet another embodiment, at least electric components of the triggering sensor arrangement and the pest detection surface are arranged on a common support surface.

According to another embodiment, the system of Claim any of claims 1 to 8, wherein the system comprises an electric power source with a limited amount of electric charge, the electric power source being sized to provide an output at a first voltage, and wherein the system comprises a voltage converter to increase the output of the electric power source to a second voltage.

In yet another embodiment, the second voltage is suitable for operating the image capture device.

According to an embodiment, the monitored area is set such that any path between the one or more entrances and the attractant crosses the monitored area.

In another embodiment, the pest detection surface is arranged between the one or more entrances and the attractant such that any path between the one or more entrances and the attractant crosses the pest detection surface.

The triggering sensor arrangement may comprise at least one photoelectric sensor.

In another embodiment, the photoelectric sensor comprises a first sensor component and a second sensor component arranged with respect to the pest detection surface such that electromagnetic radiation travelling between the first and second sensor components crosses at least a part of the pest detection surface, when viewed in plan, In another embodiment, the first component of the photoelectric sensor and the pest detection surface are arranged on a common support surface and/or wherein the second component of the photoelectric sensor and the pest detection surface are arranged on a common support surface.

The at least one photoelectric sensor may be one of a through-beam sensor, a reflective sensor, or a diffuse sensor.

In another embodiment, an electromagnetic radiation of the photoelectric sensor has a wavelength between 300 nm and 1100 nm, more preferably between 450 nm and 950 nm, more preferably between 650 nm and 950 nm, and most preferably between 750 nm and 950 nm.

Every part of the triggering sensor arrangement may be located outside of a field of view of the image capture device. Alternatively, at least parts of the triggering sensor arrangement may be located on the pest detection surface.

The triggering sensor arrangement may be arranged to monitor at least parts of the pest detection surface.

In another embodiment, the pest detection surface extends between a first end arranged proximate to the one or more entrances of the housing and a second end arranged proximate to the attractant, and wherein the triggering sensor arrangement is configured to monitor at least parts of an area that extends less than half of the way between the first and second ends, starting from the first end.

In another embodiment, the triggering sensor arrangement is configured to monitor an area between the one or more entrances and the pest detection surface.

According to another aspect of the present disclosure, there is provided a method for detecting the presence of pests within a pest detection system comprising a pest detection surface, an image capture device, and trigger sensor arrangement for detecting a target pest, the method comprising:
monitoring at least parts of the pest detection surface by means of the trigger sensor arrangement;
providing a trigger-signal to the image capture device if the presence of an object is detected by the trigger sensor arrangement;
capturing one or more images of the pest detection surface by means of the image capture device upon receipt of the trigger-signal.

According to an aspect of the present disclosure, there is provided a system for detecting the presence of pests, the system comprising an imaging system including:
a pest detection surface; and
an image capture device, said image capture device configured to capture one or more images of the pest detection surface, said image capture device comprising an imaging-sensor and a light source,
wherein the light source and the imaging-sensor are arranged on a common support surface.

According to an aspect of the present disclosure, there is provided a system for detecting the presence of pests, the system comprising an imaging system including:
a pest detection surface; and
an image capture device, said image capture device configured to capture one or more images of the pest detection surface, said image capture device comprising an imaging-sensor,
wherein the imaging-sensor and the pest detection surface are arranged on a common support surface.

According to an embodiment, the system comprises a triggering sensor arrangement for S detecting a target pest that is on or about to enter the pest detection surface, said triggering sensor arrangement being configured to provide a trigger-signal in response to a detected object, the image capture device being configured to take an image of the pest detection surface in response to the trigger-signal, and wherein at least electric components of the triggering sensor arrangement are arranged on the common support surface.

According to an aspect of the present disclosure, there is provided a system for detecting the presence of pests, the system comprising an imaging system including:
a pest detection surface;
an image capture device, said image capture device configured to capture one or more images of the pest detection surface, said image capture device comprising an imaging-sensor; and
a triggering sensor arrangement for detecting a target pest that is on or about to enter the pest detection surface, said triggering sensor arrangement being configured to provide a trigger-signal in response to a detected object, the image capture device being configured to take an image of the pest detection surface in response to the trigger-signal,
wherein at least electric components of the triggering sensor arrangement and the pest detection surface are arranged on a common support surface.

In another embodiment, the triggering sensor arrangement comprises at least one photoelectric sensor, preferably a through-beam sensor, the electric components of the photoelectric sensor including a light transmitter and a photoelectric receiver.

The pest detection surface may be arranged on the common support surface.

The common support surface is may be a printed circuit board.

In another embodiment, one or more of the pest detection surface, the image capture device, and the common support surface are axisymmetric.

The system may comprise a mirror arranged opposite to and facing the common support surface.

In another embodiment, the mirror is axisymmetric about a mirror-symmetry-axis and wherein the mirror-symmetry-axis of the mirror intersects the imaging-sensor of the image capture device and/or wherein the mirror-symmetry axis of the mirror is aligned with a central axis of the imaging-sensor.

In another embodiment, the mirror is produced by one or more of machining, injection moulding, thermoforming, vacuum forming, and stamping.

In another embodiment, the image capture device comprises a plurality of light sources, preferably arranged around a perimeter of the pest detection surface. The light sources may be arranged to illuminate the pest detection surface from multiple angles.

In another embodiment, the light source of the image capture device is configured to emit electromagnetic radiation that is invisible to a target pest, and/or wherein the light source of the image capture device is configured to emit electromagnetic radiation that is invisible to the human eye.

In another embodiment, the light source of the image capture device is configured to emit electromagnetic radiation at a wavelength between 300 nm and 1100 nm, more preferably between 450 nm and 950 nm, more preferably between 650 nm and 950 nm, and most preferably between 750 nm and 950 nm.

In another embodiment, a colour of the pest detection surface is selected such that it provides high contrast compared to a colour of the target pest.

The pest detection surface may be highly reflective to electromagnetic radiation provided by the light source of the image capture device. Alternatively, the pest detection surface may be highly absorbent to electromagnetic radiation provided by the light source of the image capture device.

According to another aspect of the present disclosure, there is provide a system for detecting the presence of pests, the system comprising;
 a pest detection surface:
 an image capture device, said image capture device comprising an imaging-sensor configured to capture one or more images of the pest detection surface, the imaging-sensor having a field of view that is smaller than the pest detection surface;
  means for increasing the field of view of the image sensor in such a way that the field of view of the image sensor covers the pest detection surface.

According to an embodiment, the means for increasing the field of view comprises a mirror.

In another embodiment, the system comprises a housing including a first wall located opposite the pest detection surface, said first wall being spaced from the pest detection surface at a first distance, the mirror being arranged on the first wall to create an optical distance between the pest detection surface and the imaging-sensor that is longer than an optical path covering the cavity height of the imaging cavity.

The mirror may be arranged opposite to and facing the pest detection surface.

The mirror may be dome shaped.

In another embodiment, the image capture device and the pest detection surface are arranged on a common support surface.

The means for increasing the field of view may comprise a wide-angle lens, particularly a fisheye lens.

The wide-angle lens may be part of the image capture device, the image capture device may have an angle of view of 75 degrees or more.

The mirror may be shaped to compensate for distortion introduced by the wide-angle lens.

In another embodiment, the mirror is produced by one or more of machining, injection moulding, thermoforming, vacuum forming, and stamping.

The pest detection surface may be shaped to compensate for distortion introduced by the wide-angle lens.

In another embodiment, the system comprises a housing, said pest detection surface and said image capture device being arranged within the housing.

The housing may comprise a top having a rounded outer surface.

In another embodiment, the housing comprises attachment means for fixing the housing to one or more components of a bed.

The housing may have an overall height of less than 30 mm.

In another embodiment, the image capture device is mounted in a fixed spatial relationship with the pest detection surface.

According to another aspect of the present disclosure, there is provided a system for detecting the presence of pests, the system comprising an imaging system including:
 a pest detection surface;
 an image capture device, said image capture device configured to capture one or more images of the pest detection surface, the image capture device comprising an imaging-sensor and a lens, said lens introducing distortions into the one or more images of the pest detection surface;
  a curved surface arranged in the field of view of the image capture device and shaped to compensate for distortions caused by the lens.

According to an embodiment, the system comprises a mirror arranged opposite to and facing the pest detection surface.

The curved surface may at least partly be defined by the mirror.

The mirror may be axisymmetric about a mirror-symmetry-axis.

In another embodiment, the mirror-symmetry-axis of the mirror intersects the imaging-sensor of the image capture device and/or wherein the mirror-symmetry-axis of the mirror is aligned with a central axis of the imaging-sensor.

In another embodiment, the mirror is arranged opposite to and facing the image capture device.

The mirror may be dome shaped.

In another embodiment, the mirror is produced by one or more of machining, injection moulding, thermoforming, vacuum forming, and stamping.

In another embodiment, the curved surface is at least partly defined by the pest detection surface.

The mirror may be substantially flat.

In another embodiment, the lens is a wide-angle lens, particularly a fisheye lens.

In another embodiment, the image capture device has an angle of view of 75 degrees or more.

According to another aspect of the present disclosure, there is provided a method for determining a shape of a surface for compensating distortions caused by a lens used in a system for detecting the presence of pests, the system comprising:
 an image capture device, said image capture device configured to capture one or more images of a pest detection surface,
 wherein the method comprises:
 taking an image of a reference object of known dimension with the image capture device;
 determining a distortion function that describes a mathematical correlation between one or more locations of the image and their corresponding locations on the reference object,
 determining a compensation function by mathematically inverting the distortion function;
 using the compensation function to calculate the shape of the of the surface for compensating the lens distortions.

According to an embodiment, the reference object is a flat, polygonal surface of known dimensions.

In another embodiment, the reference object has a checkerboard pattern with squares of known dimensions.

In another embodiment, the one or more locations of the image are one or more corners of the reference object.

In another embodiment, the distortion function is derived by correlating the one or more locations of the image and their corresponding locations on the reference object using a polynomial regression fit, preferably the method of least squares.

According to another aspect of the present disclosure, there is provided a system for detecting the presence of pests, the system comprising at least one active component with a limited lifespan and a control unit configured to:
 receive lifespan-status-data indicative of a remaining lifespan of the at least one active component;

determine, on the basis of the lifespan-status-data, a lifespan-parameter representative of a time period until the end of a working lifespan of the active component;

determine a service-status-signal on the basis of the lifespan-status-data.

According to an embodiment, the control unit is configured to:

compare the lifespan-parameter to a service-time-threshold;

determine the service-status-signal on the basis of the comparison result.

In another embodiment, the control unit is configured to determine a service-status-signal for requesting maintenance of the at least one active component, if the lifespan-parameter falls below the service-time-threshold.

In another embodiment, the at least one active component comprises an electric power supply, preferably a battery, and wherein the lifespan-status-data comprises information about a remaining amount of electric charge of the electric power supply.

In another embodiment, the life-span-status data comprises environmental-condition-data indicative of environmental conditions acting on the at least one active component.

In another embodiment, the environmental-condition-data comprises one or more of:

humidity-data indicative of air humidity levels acting on the active component;

temperature-data indicative of an air temperature acting on the active component;

In another embodiment, the control unit is configured to:

receive a service-interval-parameter representative of a predetermined time interval between scheduled services of the system;

determine a current operating time of the active component;

compare the lifespan-parameter to a difference between the service-interval-parameter and the current running time;

determine a service-status-signal on the basis of the comparison result.

In another embodiment, the control unit is configured to determine a service-status-signal for requesting maintenance of the at least one active component, if the difference between the service-interval-parameter and the current operating time is higher than the lifespan-parameter.

In another embodiment, the system comprises:

a pest detection surface; and an image capture device, said image capture device configured to capture one or more images of the pest detection surface, wherein the at least one active component comprises an electric power source for supplying the image capture device with electric power.

In another embodiment, the electric power source comprises a battery, preferably a disposable alkaline battery.

In another embodiment, the electric power source is sized to provide an output at a first voltage, and wherein the system comprises a voltage converter to increase the output of the electric power source to a second voltage.

In another embodiment, the second voltage is suitable for operating the image capture device.

In another embodiment, the system comprises a pest attractant comprising one or more active substances for attracting target pests, wherein the at least one active component comprises the one or more active substances of the pest attractant.

In another embodiment, the active substance of the pest attractant comprises one or any combination of: a pheromone, a kairomone, and food for the target pest.

In another embodiment, the system comprises a service module removably attachable to a housing of the system, and wherein said service module is adapted to receive the pest attractant and the electric power source.

According to another aspect of the present disclosure, there is provided a system comprising at least one active component with a limited lifespan, the method comprising:

receiving lifespan-status-data indicative of a remaining lifespan of the at least one active component;

determining, on the basis of the lifespan-status-data, a lifespan-parameter representative of a time period until the end of a working lifespan of the active component;

determining a service-status-signal on the basis of the lifespan-parameter.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Examples of the present invention will now be described in detail with reference to the accompanying drawings, in which.

DETAILED DESCRIPTION

The present disclosure provides systems and methods for the detection of insect pests that may be used as, or as part of, a trap, detector or monitor for pests. It substantially solves the problems described above by significantly reducing the amount of human intervention required. It also enables pest monitors, traps or detectors to be placed in locations that are not otherwise practical.

Although the present disclosure is described with respect to presently preferred embodiments for automated insect detectors it is understood that the present invention will be beneficial in a wide range of applications, including passive traps and systems with and without automatic detection capability. These systems can include traps and/or passive and active monitoring devices that may or may not having a trapping or killing functionality. While traps may constitute the majority of activity sensing pest devices in a given pest control program, devices which only monitor pest activity may be preferred in some locations and applications. Accordingly, both types of devices may be utilized in the various environments in which the present invention may be employed. Further, unless the context provides otherwise, both traps and passive or active pest monitoring devices are included within the scope of the term "pest detectors" used herein.

The present disclosure provides such a method, apparatus and system that are effective, practical, inexpensive pest detectors which allow discrete placement where the detectors where they can remain in-situ for extended periods with minimal human intervention.

Figure 1:
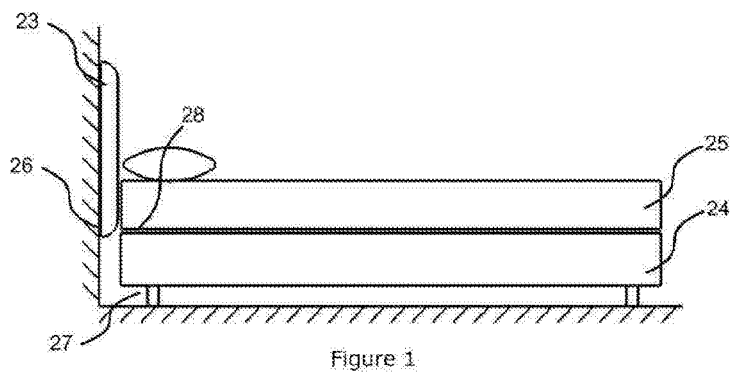
FIG. 1 is a diagram showing the components of a typical bed and common locations for pests to reside.

Referring to FIG. 1, a diagram of the advantageous locations for a monitor for bed bugs. Bed bugs typically feed on exposed areas of skin, particularly the arms, neck and upper chest and back of occupants in the bed. After feeding they move to concealed harbourages, most commonly behind the headboard 23 or in the bed structure 24 below the mattress 25. This is well known to practitioners in the field. From this ii is apparent that locations close to either the feeding or harbourage locations are good locations for a monitor. In particular, location 26 behind or immediately below the headboard and location 27 on the floor underneath the head end of the bed are advantageous because the insects must only be drawn a small distance from their natural position to reach the monitor.

Location 28 between the mattress and the bed frame is the most advantageous location because it is on the path that the insects will most commonly take, maximising the probability of a detection being made. These locations are also advantageous in that a monitor placed at these is unlikely to be noticed by the occupant of the bed. However, all of these locations have a major disadvantage in that it is difficult to access them for inspection of the monitor. In all cases it is advantageous, even essential, to minimise the amount of human intervention required. In addition, location 28 is challenging because the device must be made sufficiently thin to remain undetectable to the occupant of the bed. The present invention and the features described below solve these problems and allow a monitor that can be placed in the most advantageous location 28 without its presence being known to the bed occupant and allowing extended operating periods without human intervention.

Figure 2:
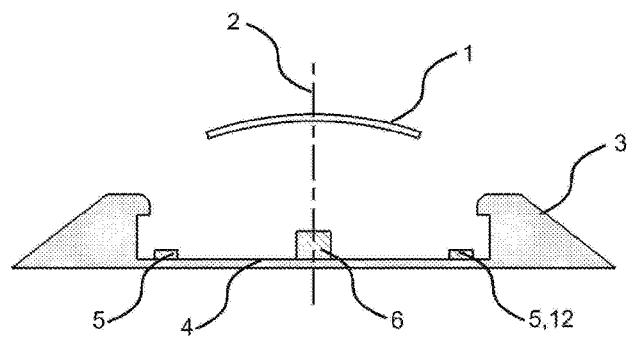
FIG. 2 is a cross section of one possible embodiment of the internal configuration for a monitor or trap.

Referring to FIG. 2, an embodiment of a system that advantageously implements the present invention is shown. An axi-symmetric optical system is arranged around axis of symmetry 2, comprising a camera 6 and a mirror 1. In this system the camera consists of an imaging sensor and a wide-angle lens, commonly referred to as a 'fish-eye' lens. The mirror is designed so that, in its reflection, the camera is able to produce an image of a floor surface 4, which will hereafter be referred to either as the device floor or the imaged surface.

In this embodiment the device floor is designed to be the lower surface of a 'pit-fall' trap, as will be familiar to an expert in the field of insect trapping. Ramps 3 allow crawling insects to access the monitor but the vertical surface prevents the insects from escaping again once they are on the device floor and are in a position to be imaged by the camera. This may be beneficial for some systems but the action of trapping an insect is not a requirement for the present invention and is included in this embodiment by way of example.

Similar arrangements comprising a lens and mirror but lacking axi-symmetry would also be possible and are encompassed by the present invention however these are considered less advantageous than the embodiment presented because optical components which are not rotationally symmetric, so called 'freeform' optical elements, are much more expensive to design and fabricate.

Additionally, additional active components 5 and 12 are co-located on the floor of the device. These may commonly be LEDs or any other source of illumination for the imaging system 5. Additionally, they may include components for triggering the imaging system when an insect is likely to be within the field of view 12.

The benefit of a system which places the active components of camera and illumination on a single plane is that it is readily manufactured using standard Printed Circuit Board (PCB) production techniques, which is beneficial in reducing the cost of the system. Conventional imaging systems for detecting pests, not corresponding to the present invention, require additional wiring and fabrication complexity.

Wide angle lenses, such as 6, typically introduce significant optical distortion. In FIG. 2 the mirror 1 is shaped in such a manner as to compensate for this distortion, resulting in a substantially rectilinear output image of the image surface 4. This dramatically reduces the amount of image processing that needs to be conducted and significantly reduces the complexity and expense of the associated processing components.

In cases where the lens 6 selected does not introduce significant distortion the optimum shape of mirror 1 will be a plane. Mirror 1 may be produced by a number of methods including but not limited to machining, injection moulding, thermoforming, vacuum forming and stamping.

Mirror 1 is suspended above the floor 4 by means not shown in this Figure but a range of methods including snaps and adhesive will be obvious to a expert in the field. This mounting could be made to the inner surface of an additional roof component, such as 11 shown in FIG. 7.

Figure 3:
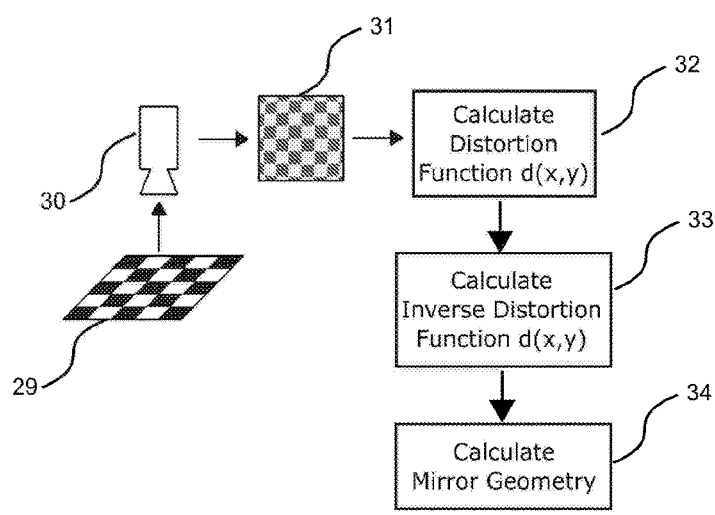
FIG. 3 shows a method for calculating the shape of a curved mirror to compensate for distortions introduced in an imaging subsystem.

FIG. 3 shows a method that may be used to deduce the necessary shape of the mirror. A reference image 31 of a known object 29, such as a uniform checkerboard of black and white squares of known size, is taken from a known distance with the lens and camera 30 to be compensated for. From this reference image the mathematical correlation between the positions of corners in the checkerboard and their true locations is derived using a polynomial least squares fit for the distortion function of the camera and lens 32. This is a bivariate equation for true position as a function of the location in the image, which is usually expressed in polar or cartesian coordinates. The inverse of this equation is the compensation function 33, which can be used to calculate the required shape of the mirror 34 by simple geometry.

Figure 4:
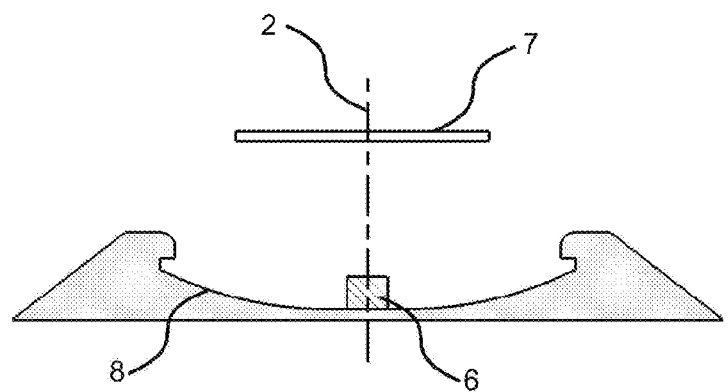
FIG. 4 is a cross section of a second possible embodiment of the internal configuration for a monitor or trap.

Referring to FIG. 4, an alternative embodiment of the present invention. In this embodiment a flat mirror 7 is suspended above camera and lens 6 and a shaped floor 8.

In this configuration the floor is designed so that its shape compensates for the lens distortion. This enables the use of a flat mirror 7, even when the lens introduces significant distortion. This embodiment offers the advantage of allowing the relatively expensive optical component to be a simple plane by adding complexity to the floor component, which may be produced with lower quality by inexpensive methods such as injection moulding.

In both FIGS. 2 and 4 the camera and lens elements 6 have a focal length appropriate to give clear focus of the system floor 4 or 8, which is approximately twice the distance between the lens and the mirror.

Figure 5:
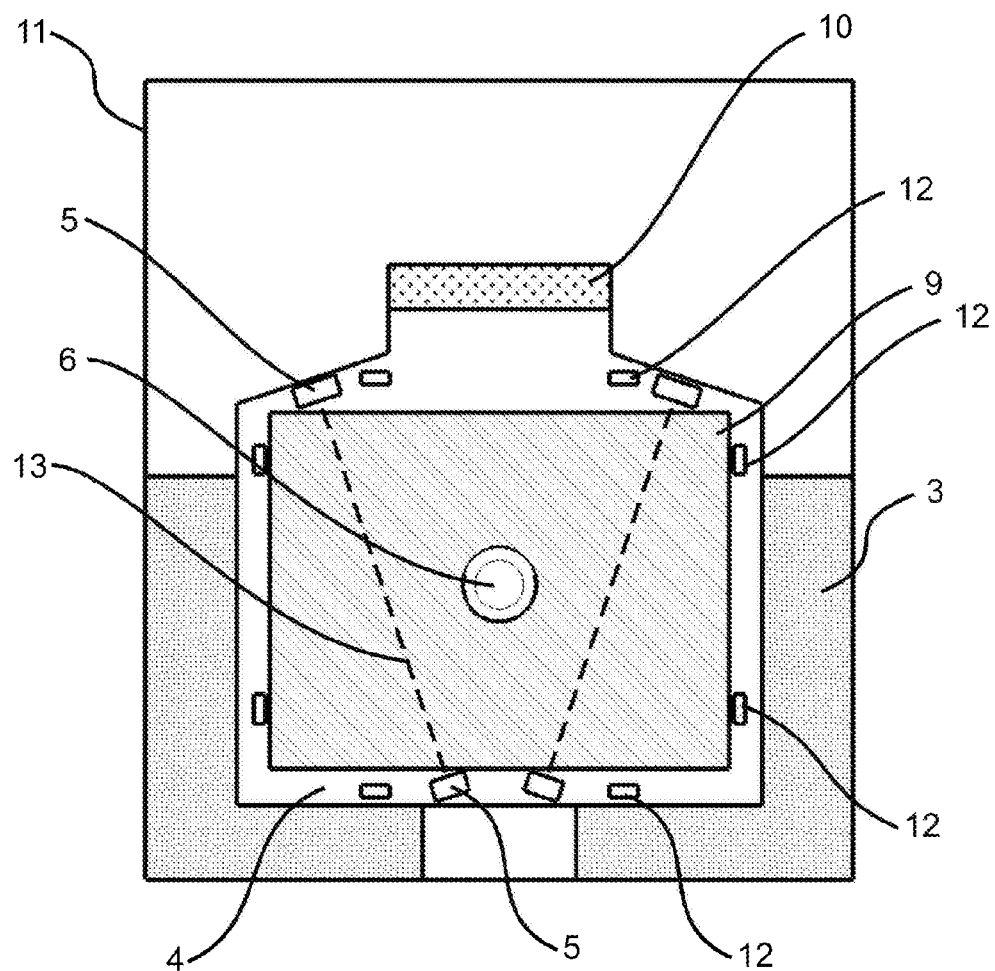
FIG. 5 is a plan view of a possible embodiment of the internal configuration for a monitor or trap.

Referring to FIG. 5, an embodiment of the present invention shown in plan view. The ramps 3, camera 6, imaging surface or floor 4, illumination elements 12, triggering sensors 5 are as described with reference to FIG. 2. Where this alternative view provides additional explanation of their function this is described below. This embodiment also includes an outer housing 11 to contain the components of the system. The field of view 9 (diagonally hatched rectangle) is designed to substantially fill the area of the floor of the system 4. This minimises the areas where an insect may be inside the monitor but not be visible to the imaging system.

The triggering sensors 5 in this embodiment are configured as a 'light gate', wherein one element is an optical emitter and the other is an optical sensor. When the light path 13 is obstructed by an insect the imaging system is triggered to capture an image. In this embodiment the locations of components 5 and the light beam 13 are advantageously located to maximise the probability that the insect is within the field of view 9, when the sensor is triggered. This is achieved by placing the sensors in close proximity to the edge of the field of view without encroaching onto the image. Arrangements with one or more of the elements 5 inside the field of view 9 are within the scope of the present invention but are not preferred because if the elements 5 are within the field of view 9 the resulting image processing is more challenging.

Furthermore, this embodiment includes an attractant 10, which may comprise a pheromone, kairomone or other attractant as will be familiar to an expert in the art of insect pest control. In this embodiment attractant 10 is located so that any insect entering the device by means of the ramps 3 (cross hatched) must pass across the monitor floor 4 and is very likely to enter the field of view 9 of the camera before they may reach the attractant 10. More advantageously the configuration would ensure that there is no route from the entrance to the device to the attractant which does not pass through both the triggering sensor arrangement of 5 and 13 and also through the field of view 9. This configuration, which could be readily achieved by a number of means, such as increasing the field of view 9 to encompass the entirety of the floor 4 are included within the scope of the present invention.

The selection of illumination wavelength depends on a number of factors. LEDs are generally preferred because they offer energy efficient light production in physically small and low-cost packages. A challenge of using LEDs is that they produce light in a narrow band of wavelengths and selection of an appropriate wavelength depends on a number of factors.

It is advantageous for low cost LEDs to be used, which makes wavelengths greater than approximately 950 nm and shorter than approximately 400 nm less advantageous than wavelengths in the near UV to near infrared range of 400 nm to 950 nm, where low cost LEDs are readily available.

Wavelengths which fall in the high-sensitivity region of the spectrum for typical silicon CMOS and CCD image sensors are also advantageous. Furthermore, wavelengths for which low cost polymer optics, typically made from PMMA, are suitable, are preferred. Other imaging sensor types are expensive and consume more power than silicon CMOS and CCD devices. Other lens types, such as glass, are fragile and expensive compared to moulded polymer lenses. For this reason, wavelengths in the range 450 nm to 950 nm are preferred.

Furthermore, it is advantageous to use a wavelength which is invisible to both the insect, to avoid triggering a flight response, and to human beings, for discretion. Most insects have very limited photoreception at wavelengths longer than 650 nm and human vision ends at approximately 750 nm. As a result, wavelengths longer than this are preferred.

Considered together, the points above mean that embodiments of the present invention will use illumination elements 12 which generate wavelengths of light for imaging in the range 300 nm to 1100 nm, more preferably between 450 nm and 950 nm, more preferably between 650 nm and 950 nm and most preferably between 750 nm and 950 nm.

The colour of the imaging surface 4 is selected to provide good image contrast for the target species of insect under the wavelength that has been selected for the illumination elements 12. In the most advantageous embodiment described above, using illumination in the range of 750 nm to 950 nm most insects substantially absorb the illumination wavelength so a surface which is highly reflective to the illumination wavelength is preferable to provide good contrast.

Figure 6:
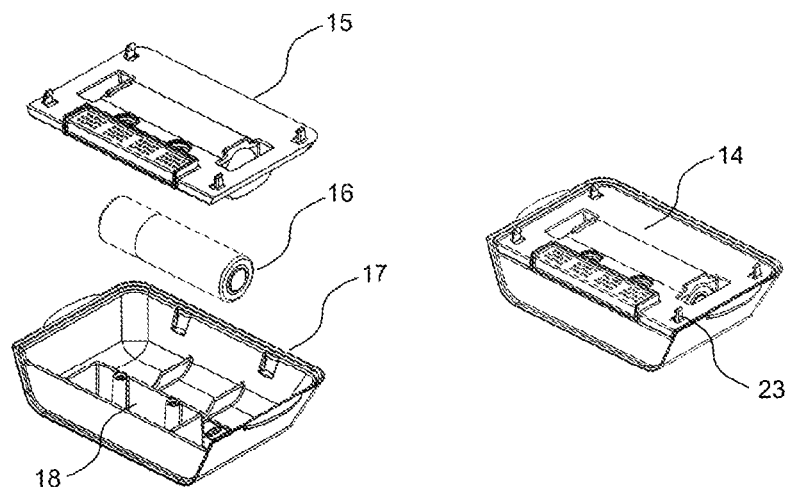
FIG. 6 shows an embodiment of a combined battery and attractant cartridge in exploded (left) and assembled (right) states.

Referring to FIG. 6, an embodiment of the present invention in both exploded (left) and assembled (right) form. This Figure shows a replaceable cartridge 14 which may be attached to the housing 11 by non-permanent means. In this embodiment this is achieved by snap features 23 but which could also be achieved by a variety of alternative approaches as will be familiar to an expert in the art, Within the cartridge 14 is contained a battery 16 and a volume for storage of attractant 18. The capacity of both 14 and 18 are designed so that both achieve a lifespan equal to or greater than the service interval of the system. Combining these consumable elements into a single, user replaceable part is beneficial because it reduces the cost and burden on the user.

Figure 7:
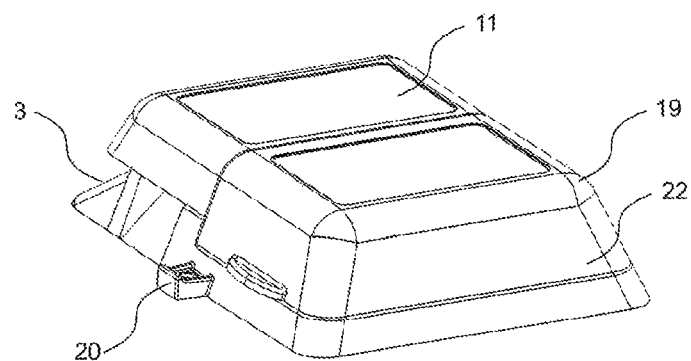
FIGS. 7 and 8 show exterior views from above and below a possible embodiment of a monitor according to the present invention.

Referring to FIG. 7, an external view of an embodiment of the present invention. Outer housing 11 attaches cartridge 14, It also comprises ramps 3, which allow insects access to the internal space below roof 22. Mirror 1 or 7 is mounted to the lower surface of roof 22, as described above. The outer housing further comprises smooth, rounded outer surfaces 19 on the top and sides to minimise any possibility of the device being felt through a mattress.

Figure 8:
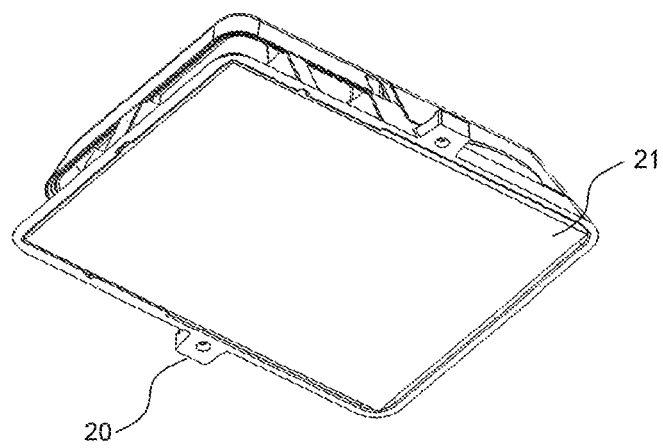

Referring to FIG. 8, an external view of the underside of the embodiment shown in FIG. 7. Attachment tabs 20 comprising hole features for screws and lip features for ties provide the ability to secure the device to a bed frame. Alternatively, and adhesive pad 21 is fitted to the underside of the device to provide a means of attachment.

Figure 9:
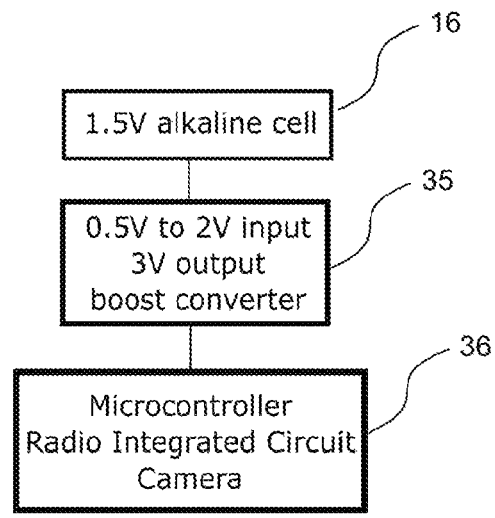
FIG. 9 shows a circuit block diagram for powering sensing and communications electronics from a low voltage source; and, FIG. 10 shows a method for eliminating on-site configuration of smart pest monitors.

Referring to FIG. 9, a circuit diagram for the power subsystem of the present invention. As described above it is advantageous for the device to be powered by battery 16 for the reasons of discretion, cost and convenience for the user. Solutions comprising multiple batteries in various series or parallel configurations may be perfectly acceptable in certain circumstances. However, it is advantageous, in order to minimise the size and cost of the trap and its consumable cartridge 14, to use a single battery or cell. For reasons of safety and cost it is advantageous that this single cell or battery be an alkaline chemistry single cell. A single alkaline cell has a working voltage of no more than 1.5 volts, which may be insufficient to run the power consuming components 36, such as imaging sensors and radio communications components. To resolve this problem, the present embodiment utilises a boost converter 35, as will be familiar to an expert in the field.

Figure 10:
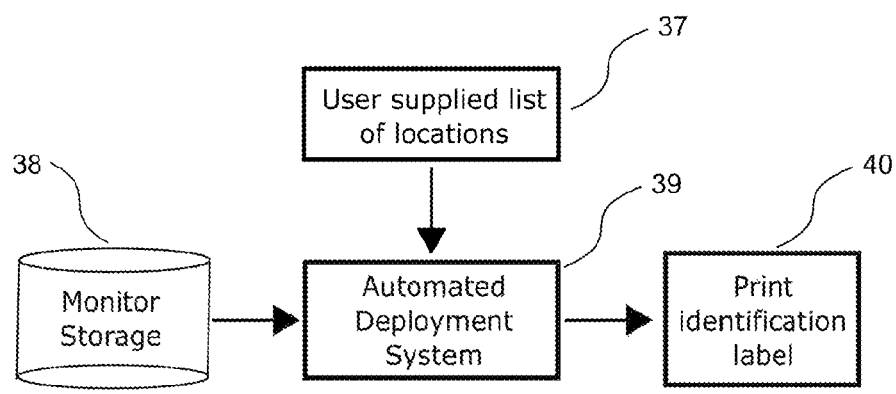

Referring to FIG. 10, The inventors have recognised the limitations of existing 'smart monitoring' solutions which require complicated setup procedures to be conducted by the user to register devices to particular locations so that the data received can be correlated to meaningful physical locations, such as a room number. The present invention avoids this problem by providing monitors preconfigured to a particular location. The user sends a list of locations to be monitored 37, such as a list of room numbers. An automated deployment system 39 takes this list and registers each location to particular devices from a store 38. The system further prints a label 40 indicating the assigned location, which is affixed to the monitor prior to shipping. On receipt of a shipment of monitors the user can simply place each monitor in the location indicated by the label, with no on-site configuration being necessary.

What is claimed is:

1. A system for detecting the presence of insects, the system comprising an imaging system including:
   a housing including one or more insect entrances,
   an insect attractant arranged within the housing;
   an insect detection surface;
   an image capture device, said image capture device configured to capture one or more images of the insect detection surface;
   a triggering sensor arrangement for detecting a target insect that is on or about to enter the insect detection surface, said triggering sensor arrangement being configured to monitor an area between the one or more entrances and the insect attractant such that any path made by an insect between the one or more entrances and the attractant crosses said monitored area and provide a trigger-signal if the presence of an object is detected, the image capture device being configured to take an image of the insect detection surface in response to the trigger-signal; and
   at least one active component with a limited lifespan indicated by a lifespan-parameter, and a control unit configured to:
      receive a service-interval-parameter representative of a predetermined time interval between scheduled services of the system;
      determine a current operating time of the at least one active component;
      compare the lifespan-parameter to a difference between the service-interval-parameter and the current operating time; and
      determine a service-status-signal on the basis of the comparison result.

2. The system of claim 1, wherein the system comprises an electric power source with a limited amount of electric charge.

3. The system of claim 1, wherein the insect detection surface is arranged between the one or more entrances and the attractant such that any path between the one or more entrances and the attractant crosses the insect detection surface.

4. The system of claim 1, wherein the triggering sensor arrangement is arranged to monitor at least parts of the insect detection surface.

5. The system of claim 1, wherein the system comprises a service module removably attachable to the housing, and wherein said service module is adapted to receive the insect attractant and/or an electric power source.

6. The system of claim 1, wherein the triggering sensor arrangement comprises at least one photoelectric sensor.

7. The system of claim 6, wherein the photoelectric sensor comprises a first sensor component and a second sensor component arranged with respect to the insect detection surface such that electromagnetic radiation travelling between the first and second sensor components crosses at least a part of the insect detection surface, when viewed in plan.

8. The system of claim 1, wherein every part of the triggering sensor arrangement is located outside of a field of view of the image capture device.

9. The system of claim 1, wherein the triggering sensor arrangement is configured to monitor an area between the one or more entrances and the insect detection surface.

10. The system of claim 1, wherein the control unit is configured to determine a service-status-signal for requesting maintenance of the at least one active component, if the difference between the service-interval-parameter and the current operating time is higher than the lifespan-parameter.

11. The system of claim 10, wherein the insect attractant comprises one or more active substances for attracting target insects, and wherein the at least one active component comprises the one or more active substances of the insect attractant.

12. The system of claim 11, wherein the active substance of the insect attractant comprises one or any combination of: a pheromone, a kairomone, and food for the target insect.

13. The system of claim 12, wherein the system comprises an electric power source with a limited amount of electric charge and a service module removably attachable to the housing, and wherein said service module is adapted to receive the insect attractant and the electric power source.

14. The system of claim 1, wherein the image capture device comprises a plurality of light sources, the light sources and image capture device being arranged on a common support surface, wherein the trigger-signal is configured to trigger the image capture device including triggering the light sources.

15. The system of claim 14, wherein the light sources of the image capture device are configured to emit electromagnetic radiation that is invisible to a target insect.

16. The system of claim 14, wherein the light sources of the image capture device are configured to emit electromagnetic radiation that is visible to the human eye.

17. The system of claim 14, wherein a colour of the insect detection surface is selected such that it provides high contrast compared to a colour of the target insect, and wherein the insect detection surface is highly reflective to electromagnetic radiation provided by the light sources of the image capture device.

18. The system of claim 1, wherein the insect attractant is spaced from and directly on a path with the one or more entrances.

19. A method for detecting the presence of insects within an insect detection system comprising an insect detection surface, an image capture device, and triggering sensor arrangement for detecting a target insect, the method comprising:
   monitoring at least parts of the insect detection surface by the triggering sensor arrangement;
   providing a trigger-signal to the image capture device if the presence of an object is detected by the triggering sensor arrangement, the trigger sensor being configured to monitor an area between one or more entrances and an insect attractant, the area set such that any path made by an insect between the one or more entrances and the attractant crosses said monitored area; and capturing one or more images of the insect detection surface by the image capture device upon receipt of the trigger-signal.

20. A system for detecting the presence of insects, the system comprising an imaging system including:

a housing including one or more insect entrances, an insect attractant arranged within the housing;

an insect detection surface;

an image capture device, said image capture device configured to capture one or more images of the insect detection surface; and a triggering sensor arrangement for detecting a target insect that is on or about to enter the insect detection surface, said triggering sensor arrangement being configured to monitor an area between the one or more entrances and the insect attractant such that any path made by an insect between the one or more entrances and the attractant crosses said monitored area and provide a trigger-signal if the presence of an object is detected, the image capture device being configured to take an image of the insect detection surface in response to the trigger-signal, wherein the triggering sensor arrangement comprises at least one photoelectric sensor, and the photoelectric sensor comprises a first sensor component and a second sensor component both located on the insect detection surface and arranged with respect to the insect detection surface such that electromagnetic radiation travelling between the first and second sensor components crosses at least a part of the insect detection surface, when viewed in plan.

21. The system of claim 20, wherein the direction of electromagnetic radiation travelling between the first and second sensor components is substantially aligned to the insect detection surface.

* * * * *